United States Patent [19]

Oliver

[11] Patent Number: 4,764,709
[45] Date of Patent: Aug. 16, 1988

[54] TOP/BOTTOM PINCUSHION CORRECTION CIRCUIT WITH AUTOMATIC PICTURE TRACKING

[75] Inventor: Kirk Oliver, Forest Park, Ill.

[73] Assignee: Zenith Electronics Corporation, Glenview, Ill.

[21] Appl. No.: 67,574

[22] Filed: Jun. 26, 1987

[51] Int. Cl.[4] .............................................. H01J 29/56
[52] U.S. Cl. ..................................... 315/370; 315/371
[58] Field of Search .............. 315/370 APS, 371 APS

[56] References Cited

U.S. PATENT DOCUMENTS 4,335,333  6/1982  Ramsay et al. ...................... 315/371
4,496,882  1/1985  Oliver et al. ......................... 315/371

FOREIGN PATENT DOCUMENTS 0007820  1/1979  Japan .................................... 315/371

Primary Examiner—Theodore M. Blum
Assistant Examiner—Gregory C. Issing

[57] ABSTRACT

A top/bottom pincushion correction circuit includes a multiplier having a gain control input coupled to a differential amplifier, one input of which is a ground potential and the other of which has a voltage dependent upon the B+ voltage supplied to the horizontal deflection system. A voltage divider is connected between the B+ voltage and a zener diode that provide a reference potential. Changes in B+ voltage are indicative of changes in the horizontal raster size and result in a compensating current being supplied to the gain control input of the multiplier which develops a corresponding change in pincushion correction signal amplitude.

3 Claims, 1 Drawing Sheet

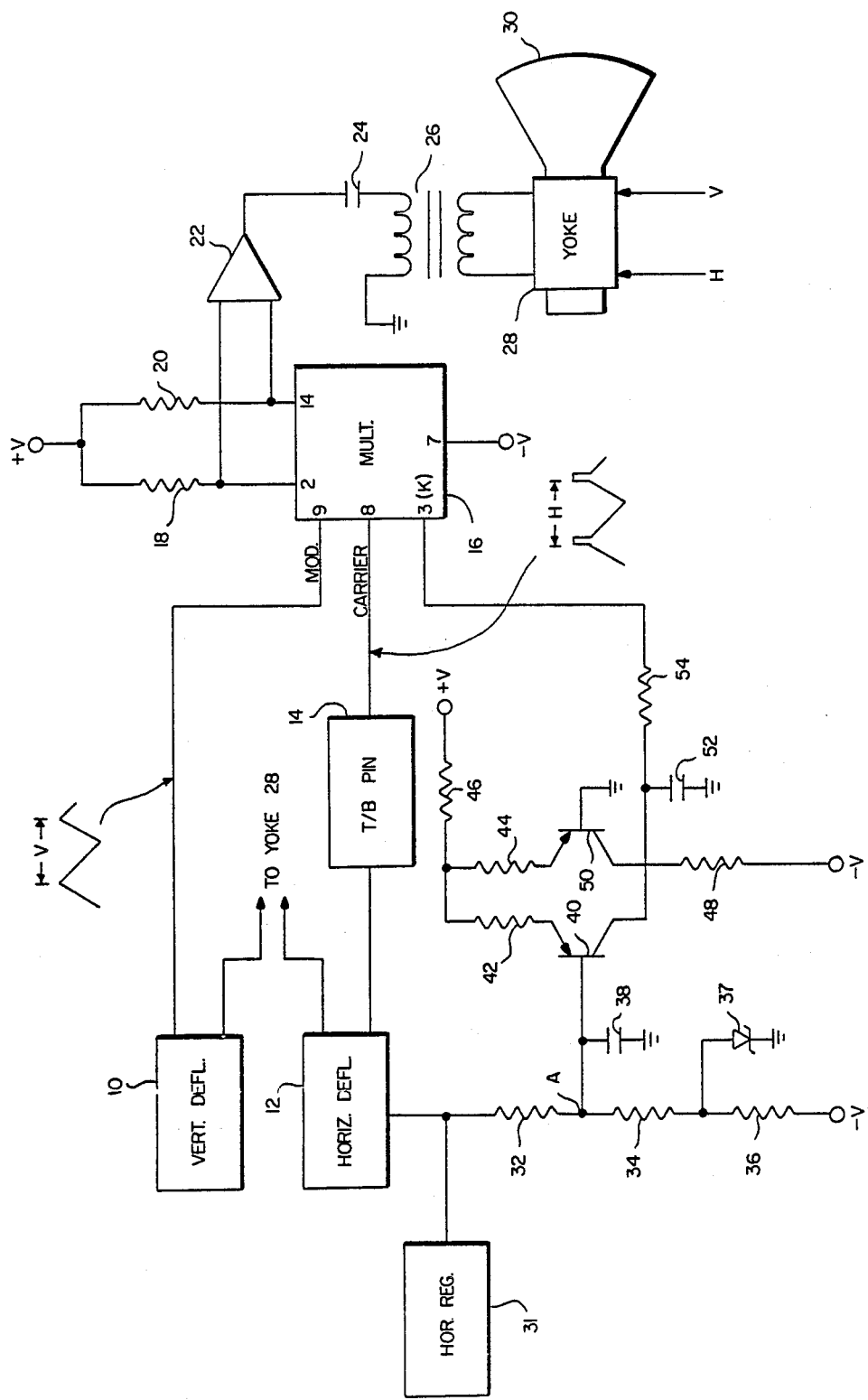

4,764,709

TOP/BOTTOM PINCUSHION CORRECTION CIRCUIT WITH AUTOMATIC PICTURE TRACKING

CROSS REFERENCE TO RELATED APPLICATIONS

This invention is related to application Ser. No. 000,694, filed 1/6/87, entitled INDEPENDENT TOP/BOTTOM PINCUSHION CORRECTION and application Ser. No. 000,695, filed 1/6/87, entitled SIDE PINCUSHION CORRECTION CIRCUIT WITH AUTOMATIC PICTURE TRACKING, both in the name of Kirk Oliver and assigned to ZENITH ELECTRONICS CORPORATION. Both of the applications are incorporated by reference herein.

BACKGROUND OF THE INVENTION AND PRIOR ART

This invention relates generally to top/bottom pincushion correction circuits for raster displays on cathode ray tubes (CRTs) and particularly to active top/bottom pincushion correction circuits. The above-mentioned copending applications relate to active pincushion correction circuits that are especially adapted for use in color monitors used as computer output display devices. Specifically, the CRT display devices are constructed with substantially flat faceplates. Application Ser. No. 000,694 is directed to independent top/bottom pincushion correction circuitry in which the pincushion correction signal for the top portion of the raster may be separately tailored from the pincushion correction signal for the bottom portion of the raster to meet the exacting requirements of modern day monitors. Application Ser. No. 000,695 relates to side pincushion correction circuitry that tracks with changes in raster size. The present invention may advantageously be used with either or both of the inventions in the copending applications. Its benefits, however, are independent and the invention may be used alone, if desired.

In both of the copending applications, multipliers are utilized to develop the output pincushion correction signals. The multipliers include an array of differentially coupled transistors and current sources and have modulating inputs and carrier inputs and produce differential outputs consisting of the multiplied input signals. In Ser. No. 000,694, a gain control input on the multiplier is coupled to a voltage that is representative of the horizontal size of the raster and the vertical ramp signal is applied to the modulating and carrier inputs of the multiplier. Since the vertical ramp signal is dependent upon the vertical size of the raster, the pincushion correction signal tracks with vertical raster size changes. In the present invention, the top/bottom pincushion correction multiplier has its gain control terminal coupled to receive a voltage that is indicative of horizontal raster size changes and thus enables automatic tracking of changes in raster size for the top/bottom pincushion correction signal.

OBJECTS OF THE INVENTION

Accordingly, a principal object of the invention is to provide an improved top/bottom pincushion correction circuit.

Another object of the invention is to provide a top/bottom pincushion correction circuit that automatically tracks raster size changes.

BRIEF DESCRIPTION OF THE DRAWING

These and other objects and advantages of the invention will be apparent upon reading the following description in conjunction with the drawing, the single figure of which is a partial block, partial schematic diagram of a top/bottom pincushion correction circuit constructed in accordance with the invention.

DESCRIPTION OF THE PREFERRED EMBODIMENT

Referring to the drawing, a vertical deflection system 10 and a horizontal deflection system 12 generate conventional horizontal and vertical deflection signals for application to a yoke 28 that is situated on the neck of a CRT 30. Horizontal deflection system 12 also supplies a signal to a top/bottom pincushion waveform generator 14 which is preferably an active pincushion circuit constructed in accordance with the invention described in copending application Ser. No. 000,694. The output of top/bottom pincushion waveform generator 14 is coupled to the carrier input of a multiplier 16. The modulating input of multiplier 16 is supplied with a vertical ramp signal from vertical deflection system 10. Multiplier 16 is preferably a monolithic circuit identified by the type designation MC1495 with the pin connections indicated. Thus the modulating input of multiplier 16 is pin 9 and the carrier input is pin 8. A pair of load resistors 18 and 20 are connected to pins 2 and 14, respectively, of multiplier 16 and to a source of voltage $+V$ which is generally on the order of $+16$ volts DC. Pin 7 is connected to a negative source of voltage $-V$ which may be on the order of $-16$ volts DC. Resistors 18 and 20 are connected to a pincushion correction signal amplifier 22 which supplies a series connection of a capacitor 24 and the primary winding of a pincushion correction transformer 26. The secondary winding of pincushion correction transformer 26 is connected to yoke 28, specifically it is in series with the vertical winding of yoke 28 for producing a horizontal rate correction signal therein for correcting the top/bottom pincushion distortion of the raster.

A horizontal regulator 31 supplies horizontal scan $B+$ voltage to horizontal deflection circuit 12. This horizontal scan $B+$ voltage is also applied to a series arrangement of resistors 32, 34 and 36 that is connected to a source of voltage $-V$, which may also be on the order of $-16$ volts DC. The junction of resistors 34 and 36 is connected to ground through a zener diode 37, that is selected to maintain a constant voltage of about $+12$ volts across its terminals. The junction A of resistors 32 and 34 (which function as a voltage divider) is connected to the base of a PNP transistor 40 and to an integrating capacitor 38. A PNP transistor 50 is operated with transistor 40 as a differential amplifier and has its base connected to ground. The emitters of the transistors 40 and 50 are connected through resistors 42 and 44, respectively, to a resistor 46 that is connected to $+V$. The collector of transistor 50 is connected to $-V$ through a load resistor 48. The collector of transistor 40 is the output of the differential amplifier and is connected through a resistor 54 to the gain control (K) input of multiplier 16. This K input is at terminal 3 of the multiplier. A capacitor 52, for removing noise and any ripple voltages from the differential amplifier is connected between the collector of transistor 40 and ground.

In operation, the voltage developed across zener diode 37 is −12 volts DC and resistors 32 and 34 are selected to produce zero volts at junction A under normal operation conditions (i.e., normal output B+ voltage from horizontal regulator 31). Transistor 40 is thus conductive and supplies a given current, through resistor 54, to pin 3 of multiplier 16 which controls the signal output amplitude of the multiplier (at pins 2 and 14) and hence the amplitude of the pincushion correction signal supplied to pincushion correction transformer 26. Assume an increase in horizontal raster size is desired. The output of the horizontal regulator 31 is increased, thus increasing the horizontal B+ voltage applied to the horizontal deflection circuits 12 which supply yoke 28. The voltage at point A is also increased, in an amount determined by the ratios of resistors 32 and 34, to drive transistor 40 less conductive (transistor 50 compensates by conducting more) and supply less current to the gain terminal 3 of multiplier 16. This causes the output voltage swing of the multiplier at terminals 2 and 14 to increase and thereby supply an increased magnitude pincushion correction signal. Thus the pincushion correction signal applied to pincushion correction transformer 26 is automatically compensated for the increase in horizontal raster size. The differential amplifier arrangement provides an accurate circuit for closely tracking horizontal raster size changes.

Changes in the vertical size of the raster are also accompanied by increases in the magnitude of the vertical ramp signal that is applied to pin 9 of multiplier 16, and therefore, the pincushion correction output signal is automatically compensated for changes in vertical size also.

Thus, with the invention, the top/bottom pincushion correction signal automatically tracks for changes in raster size of the display. It is recognized that changes in the described embodiment of the invention will be apparent to those skilled in the art without departing from its true spirit and scope. The invention is to be limited only as defined in the claims.

What is claimed is:

1. A top/bottom pincushion correction circuit comprising:
    a horizontal deflection means for developing a horizontal deflection signal;
    a source of B+ voltage supplying said horizontal deflection means;
    a vertical deflection means for developing a vertical deflection signal;
    a top/bottom pincushion development means coupled to said horizontal deflection circuit for developing a top/bottom pincushion correction signal;
    a multiplier including a modulating input, a carrier input and a gain control input;
    means coupling said top/bottom pincushion correction signal and said vertical deflection means to said carrier input and said modulating input of said multiplier;
    deflection means coupled to the output of said multiplier; and
    means coupled to said horizontal deflection means and to said gain control input of said multiplier for varying the magnitude of the output of said multiplier to follow the magnitude of said horizontal deflection signal, said means for varying the magnitude of the output of said multiplier including a source of reference voltage and comparison means for comparing the voltage from said source of B+ voltage with said reference voltage.

2. The correction circuit of claim 1 wherein said comparison means includes a voltage divider and a zener diode connected to said source of B+ voltage and a differential amplifier.

3. A pincushion correction circuit that tracks changes in raster size in a CRT deflection system, including horizontal and vertical deflection systems and a yoke, comprising:
    top/bottom pincushion signal means for developing a top/bottom pincushion correction signal, coupled to said horizontal deflection system;
    a multiplier having a modulating input, a carrier input and a gain control input, and generating an output signal, having one of said modulation input and said carrier input coupled to said vertical deflection system and the other of said modulation input and said carrier input coupled to said top/bottom pincushion signal means and an output coupled to said yoke;
    regulator means for supplying B+ voltage to said horizontal deflection system;
    voltage divider means having one end connected to said regulator means and defining a voltage junction;
    zener diode means for developing a reference potential connected to the other end of said voltage divider means; and
    a differential amplifier having one input connected to said voltage junction and another input fixed with respect to said reference potential and an output coupled to said gain control input of said multiplier for changing the gain of said multiplier as a function of the B+ voltage applied to said horizontal deflection system.

* * * * *